United States Patent
Kompella (10) Patent No.: US 8,018,873 B1
(45) Date of Patent: Sep. 13, 2011

(54) ENHANCED LINK STATE PROTOCOL FOR IDENTIFYING BROADCAST NETWORKS

(75) Inventor: Kireeti Kompella, Los Altos, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 387 days.

(21) Appl. No.: 12/267,152

(22) Filed: Nov. 7, 2008

Related U.S. Application Data (60) Provisional application No. 60/986,439, filed on Nov. 8, 2007.

(51) Int. Cl.
  *H04L 12/28* (2006.01)
  *G06F 15/16* (2006.01)
(52) U.S. Cl. .................... 370/254; 370/408; 709/228
(58) Field of Classification Search .................. None
See application file for complete search history.

(56) References Cited

U.S. PATENT DOCUMENTS

| | | | | |
|---|---|---|---|---|
| 5,251,205 A * | 10/1993 | Callon et al. | ........... | 370/392 |
| 5,430,727 A * | 7/1995 | Callon | ........... | 370/401 |
| 6,339,595 B1 * | 1/2002 | Rekhter et al. | ........... | 370/392 |
| 6,393,486 B1 * | 5/2002 | Pelavin et al. | ........... | 709/238 |
| 6,445,922 B1 * | 9/2002 | Hiller et al. | ........... | 455/433 |
| 6,473,421 B1 * | 10/2002 | Tappan | ........... | 370/351 |
| 6,603,756 B1 * | 8/2003 | Tappan | ........... | 370/351 |
| 6,711,152 B1 * | 3/2004 | Kalmanek et al. | ........... | 370/351 |
| 6,956,820 B2 * | 10/2005 | Zhu et al. | ........... | 370/230.1 |
| 7,065,059 B1 * | 6/2006 | Zinin | ........... | 370/312 |
| 7,136,374 B1 * | 11/2006 | Kompella | ........... | 370/352 |
| 7,190,678 B2 * | 3/2007 | Thubert et al. | ........... | 370/254 |
| 7,231,459 B2 * | 6/2007 | Saraph et al. | ........... | 709/241 |
| 7,260,648 B2 * | 8/2007 | Tingley et al. | ........... | 709/245 |
| 7,551,599 B2 * | 6/2009 | Levit et al. | ........... | 370/351 |
| 7,586,897 B2 * | 9/2009 | Ruffino et al. | ........... | 370/351 |
| 7,619,989 B2 * | 11/2009 | Guingo et al. | ........... | 370/254 |
| 7,620,069 B2 * | 11/2009 | Kompella | ........... | 370/469 |
| 7,649,852 B2 * | 1/2010 | Thubert et al. | ........... | 370/254 |
| 7,778,235 B2 * | 8/2010 | Thubert et al. | ........... | 370/351 |
| 7,782,902 B2 * | 8/2010 | Deerman et al. | ........... | 370/469 |
| 7,792,987 B1 * | 9/2010 | Vohra et al. | ........... | 709/238 |
| 7,808,968 B1 * | 10/2010 | Kalmanek et al. | ........... | 370/351 |
| 7,839,869 B1 * | 11/2010 | Fotedar et al. | ........... | 370/401 |
| 7,860,024 B1 * | 12/2010 | Greenberg et al. | ........... | 370/254 |
| 2004/0246902 A1 * | 12/2004 | Weinstein et al. | ........... | 370/238 |
| 2006/0203820 A1 * | 9/2006 | Coluccio | ........... | 370/392 |
| 2007/0008949 A1 * | 1/2007 | Balandin | ........... | 370/351 |
| 2007/0019676 A1 * | 1/2007 | Kompella | ........... | 370/468 |
| 2007/0038743 A1 * | 2/2007 | Hellhake et al. | ........... | 709/224 |
| 2007/0280249 A1 * | 12/2007 | Draves, Jr. | ........... | 370/392 |

(Continued)

*Primary Examiner* — Gregory Sefcheck
(74) *Attorney, Agent, or Firm* — Shumaker & Sieffert, P.A.

(57) ABSTRACT

An enhanced link state protocol is described for uniquely identifying broadcast networks having overlapping address spaces within a network system. A network device generates first and second link state advertisements (LSAs) in accordance with this link state protocol. The first LSA includes a first identifier dependent on layer 3 addressing information assigned to a physical interface of the first network device that interfaces with a layer 2 communication medium, e.g., an IP subnet address prefix. The second LSA includes a second identifier independent of the layer 3 addressing information assigned to the physical interface of the first network device that interfaces with the layer 2 communication medium, e.g., a unique network identifier associated with a broadcast network. By transmitting this second LSA to a second network device, the network device may uniquely identify broadcast networks having overlapping address spaces.

22 Claims, 6 Drawing Sheets

U.S. PATENT DOCUMENTS

| | | | |
|---|---|---|---|
| 2008/0025270 A1* | 1/2008 | Moon | 370/338 |
| 2008/0205401 A1* | 8/2008 | Mirtorabi et al. | 370/392 |
| 2009/0158418 A1* | 6/2009 | Rao et al. | 726/12 |
| 2010/0046526 A1* | 2/2010 | Kompella | 370/395.53 |
| 2010/0118732 A1* | 5/2010 | Filsfils et al. | 370/252 |
| 2010/0302973 A1* | 12/2010 | Lange et al. | 370/254 |

* cited by examiner

ENHANCED LINK STATE PROTOCOL FOR IDENTIFYING BROADCAST NETWORKS

This application claims the benefit of U.S. Provisional Application No. 60/986,439, filed Nov. 8, 2007, the entire content of which is incorporated herein by reference.

TECHNICAL FIELD

The invention relates to computer networks and, more particularly, to routing protocols used within computer networks.

BACKGROUND

A routing protocol defines a process by which network devices, referred to as routers in packet-switched networks, communicate with each other to disseminate information that allows the routers to select routes between any two nodes on a computer network. One type of routing protocol, referred to as a link state protocol, allows routers to exchange and accumulate link state information, i.e., information describing the various links within the network. With a typical the link state routing protocol, the routers exchange information related to available interfaces, metrics and other variables associated with network links. This allows a router to construct its own topology or map of the network. One example of a link state protocol is Open Shortest Path First (OSPF).

Specifically, through application of the link state protocol, the routers exchange link information with other adjacent routers via Link State Advertisements (LSAs). A router generating an LSA typically floods the LSA throughout the network such that every other router receives the LSA. In this way, the receiving routers may construct and maintain their own network topologies using the link information exchanged via the LSAs.

One type of LSA that may be produced, referred to as "router LSA," carries information that specifies the router that generated the LSA, the routers to which the generating router is directly coupled, and a sequence number. The information within the LSA specifying the generating router as well as the routers to which the generating router is coupled defines the links through the network. The sequence number defines the temporal status of the LSA. That is, the routers receiving the router LSA maintain previous LSAs from every other router and may compare the previous sequence number to the current sequence number to determine if the current LSA represents a more recent update than the previous LSA. If so, the receiving routers update their network topologies to reflect links specified in the current LSA. In this manner, each router may propagate link-state changes in the network topology quickly and efficiently to all other routers in the network.

In networks comprising a broadcast sub-network, such as an Ethernet sub-network, the routers within the broadcast sub-network may designate one of these broadcast routers to serve as a main forwarding conduit for all of the other broadcast routers' LSAs to the rest of the network. In addition to appearing as a network router within the network topology, this router, referred to as the designated router, appears as an additional logical or virtual router having links to all of the other routers. The selection and use of one of the routers as a designated router that appears as a central hub may greatly simplify the quantity of LSAs that need be transmitted as well as simplifying the network map or topology by eliminating unnecessary paths specifying the fully-meshed nature of the broadcast sub-network.

Unlike the other link-state routers within the network, the designated router generates a variation of the above described router LSA, i.e., a different type of LSA known as a "network LSA." The network LSA designates link information in a manner similar to the router LSA, but further designates the subnet address of the broadcast network to identify the specific broadcast network to which the LSA pertains. All of the other broadcast routers within the subnet transmit their router LSAs to the designated router.

However, in some situations the specification of the subnet address within the network LSA may be problematic. For example, in networks having multiple broadcast sub-networks, the link state routing protocol may propagate a network topology that does not accurately represent the underlying physical network. The inaccurate network topology results, for example, when two or more broadcast sub-networks are identified by the same subnet address. As another example, inaccuracies may arise with the use of a link-state routing protocol in a network when one or more broadcast sub-networks are configured with a so called "/32" host address (i.e., a X.X.X.X/32 subnet address). In these instances of overlapping subnet address, the designated routers for each broadcast sub-network may possibly update each other's sub-network by issuing respective network LSAs bearing the same subnet address. Unable to distinguish between the sub-networks due to the overlapping subnet addresses, link-state routers within the different subnets that receive the successive LSAs will therefore maintain only one sub-network in their network topologies instead of the two actual sub-networks, thereby inaccurately representing the underlying physical network. This may result in forwarding loops or other network errors.

SUMMARY

In general, techniques are described for providing an enhanced link state protocol for broadcast networks, such as Ethernet. In one example, the techniques are implemented within the framework of the Open Shortest Path First (OSPF) link state protocol to create a new type of network LSA that uniquely identifies multiple broadcast networks having overlapping subnet addresses within a computer network. By uniquely identifying multiple broadcast networks bearing overlapping subnet addresses, network devices residing within the computer network that receive this new type of network LSA are able to correctly represent the underlying physical network within their link state databases.

For example, the techniques allow a network device to generate an LSA in accordance with a link state protocol, such as the OSPF protocol, to uniquely identify multiple broadcast sub-networks residing within a computer network. The network device may support a first type of network LSA, such as the network LSA defined by the OSPF protocol, that includes a first network identifier dependent on layer 3 addressing information, e.g., an Internet Protocol (IP) subnet address or prefix, assigned to a physical interface of the network device that interfaces with a layer 2 communication medium, such as an Ethernet link. The dependent network identifier within the network LSA typically is the IP subnet address assigned to a broadcast sub-network.

In addition, the network device also supports an alternative type of network LSA that includes a second network identifier that is entirely independent of the layer 3 addressing information discussed above. The second, independent network LSA may comprise a number assigned to that broadcast network that uniquely represents the broadcast network within the computer network in a manner that is independent of the layer 3 addressing information assigned to the physical interface of the network device. The network device, acting as the designated router for the OSPF protocol, may automatically transmit either or both of the first type and second type of network LSA throughout the computer network depending upon the topology of the network. In this manner, the receiving network device may process the second type of network LSA to distinguish between two broadcast networks bearing overlapping subnet addresses, as the second LSA does not utilize the layer 3 subnet addresses assigned to the overlapping broadcast networks but instead employs a unique identifier to distinguish between the overlapping broadcast networks. Thus, the receiving network devices can correctly represent the underlying physical networks within their link state database representing the topology of the network.

In one embodiment, a method of exchanging link state information within a layer two (L2) broadcast network comprising generating, with a first network device, a first type of network link state advertisement (LSA) in accordance with a link state protocol, the first type of network LSA including a first identifier for identifying the layer two (L2) broadcast network, wherein the first identifier is generated based upon layer 3 addressing associated with the L2 broadcast network and transmitting the first type of network LSA on the L2 broadcast network from the first network device to at least a second network device. The method further comprises generating, with the first network device, a second type of network LSA in accordance with the link state protocol, wherein the second type of network LSA includes a second identifier for identifying the L2 broadcast network, wherein the second identifier is independent of the layer 3 addressing associated with the L2 broadcast network, and transmitting the second type of network LSA from the first network device.

In another embodiment, a computer-readable storage medium comprising instructions for causing a programmable processor included within a first network device to generate a first type of network link state advertisement (LSA) in accordance with a link state protocol, the first type of network LSA including a first identifier for identifying a layer two (L2) broadcast network, wherein the first identifier is generated based upon layer 3 addressing associated with the L2 broadcast network and transmitt the first type of network LSA on the L2 broadcast network from the first network device to at least a second network device. The computer-readable storage medium further comprises instructions for causing the programmable processor to generate a second type of network LSA in accordance with the link state protocol, wherein the second type of network LSA includes a second identifier for identifying the L2 broadcast network, wherein the second identifier is independent of the layer 3 addressing associated with the L2 broadcast network, and transmit the second type of network LSA from the first network device.

In another embodiment, a network device that exchanges link state information within a layer two (L2) broadcast network comprising a control unit that generates (i) a first type of network link state advertisement (LSA) in accordance with a link state protocol, the first type of network LSA including a first identifier for identifying the layer two (L2) broadcast network, wherein the first identifier is generated based upon layer 3 addressing associated with the L2 broadcast network, and (ii) a second type of network LSA in accordance with the link state protocol, wherein the second type of network LSA includes a second identifier for identifying the L2 broadcast network, wherein the second identifier is independent of the layer 3 addressing associated with the L2 broadcast network. The network device further comprises an interface card that interfaces with the layer 2 communication medium and transmits: (i) the first type of network LSA on the L2 broadcast network to at least one other network device, and (ii) the second type of network LSA to at least the one other network device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
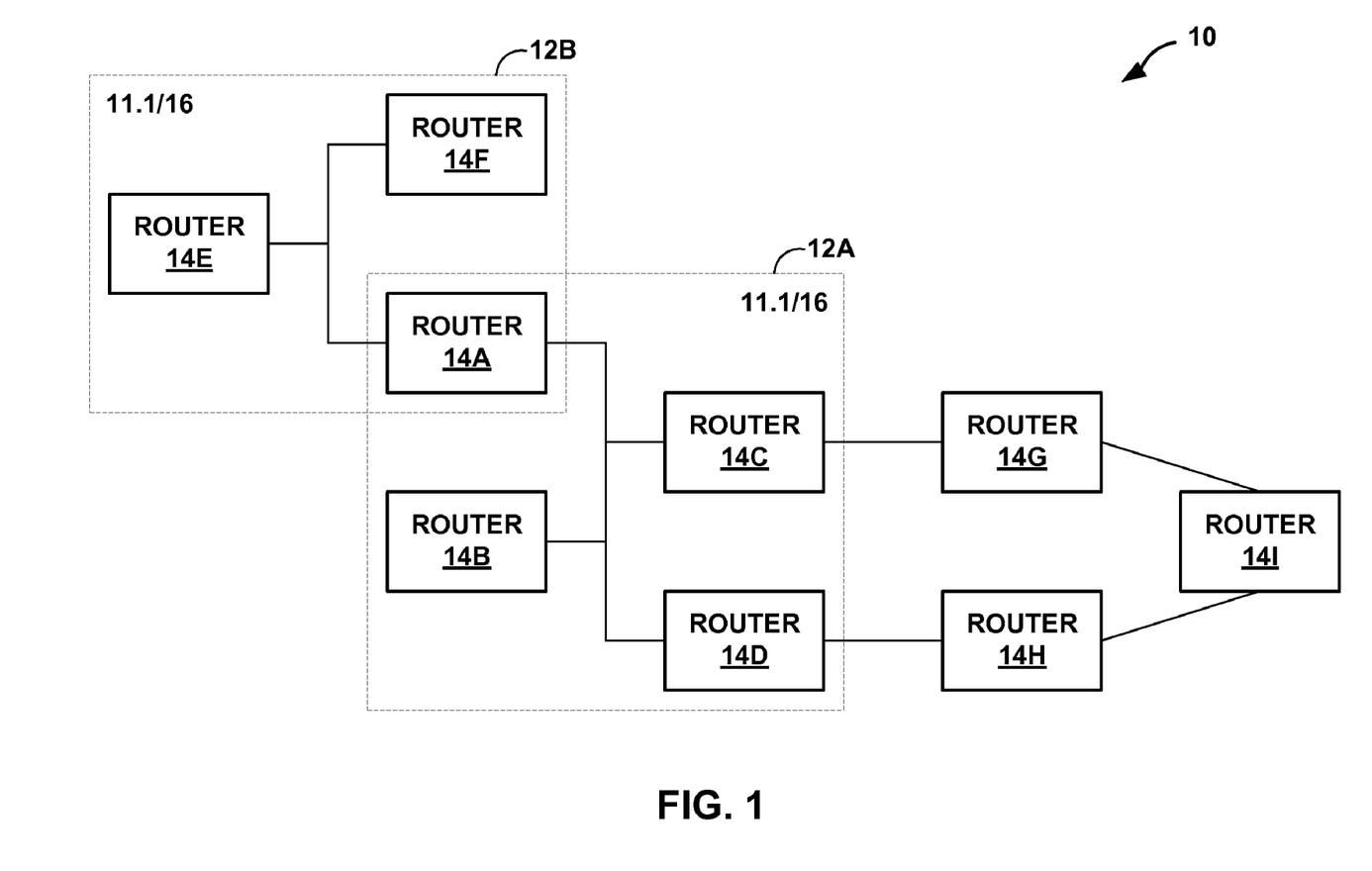
FIG. 1 is a block diagram illustrating an exemplary network system that supports an enhanced link state protocol consistent with the principles of the invention.

FIG. 1 is a block diagram illustrating an exemplary network system 10 that supports an enhanced link state protocol consistent with the principles of the invention. Network system 10 includes broadcast networks 12A, 12B ("broadcast networks 12"). Broadcast networks 12 are referred to as "broadcast networks" in that layer two (L2) communications for the network are sent to all devices within the network. One example of a broadcast network is an Ethernet network, for example, in which an Ethernet frame is communicated in along all links to all nodes of the network.

In the illustrated embodiment of FIG. 1, broadcast network 12A includes routers 14A-14D coupled together via a layer 2 communication medium (e.g., Ethernet), and broadcast network 12B includes routers 14A, 14E, 14F also coupled together via a layer 2 communication medium. Network system 10 further includes routers 14G-14I, which couple either directly or indirectly to broadcast network 12A. In this example, router 14A is physically present in both broadcast networks 12A and 12B, which may be a common scenario utilizing different physical interfaces provided by the router. Although not shown in FIG. 1, network system 10 may include other networks coupled to routers 14A-14I ("routers 14"), as well as, various other network devices, such as switches and hubs. Further, although not shown in FIG. 1, network system 10 may also include computing devices, such as laptop computers, desktop computers, workstations, personal digital assistants (PDAs), and cellular phones.

In this example, broadcast networks 12 are each assigned the same layer 3 subnet address prefix of "11.1/16," which is shown in the respective upper right and left corners of broadcast networks 12A, 12B in FIG. 1. Reference to layers herein, such as layer 2 and layer 3, refer to the appropriate layer in the Open Systems Interconnection (OSI) model. In particular, layer 2 refers to the data link layer within the OSI model. The data link layer may provide the functional and procedural methods to transfer data between the network devices and to detect and possibly correct errors that may occur in the physical layer. An example of a layer 2 communication medium is an Ethernet link. Layer 3 refers to the network layer within the OSI model. The network layer may provide the functional and procedural methods for transferring variable length data sequences from a source to a destination via one or more networks while maintaining the quality of service requested by higher layers. An example of a layer 3 protocol is the Internet Protocol (IP). The layer 3 subnet address prefix shown in FIG. 1 represents an IP subnet address prefix.

An IP subnet address generally comprises a four byte number with each byte separated by a period when written. Because a byte may represent any number within the range of 0 to 255, an exemplary subnet address may be 11.1.1.1 or 255.255.255.255. A range of IP subnet addresses may be represented by appending a forward slash to the end of an abbreviated subnet address, i.e., a subnet address prefix, followed by a number ranging from 1 to 32. The number following the forward slash indicates the number of bits in the subnet address that when appended to the end of the prefix are considered within the range of subnet IP addresses. Typically, the prefix followed by the forward slash and number is referred to collectively as the "subnet address prefix" and subnet address prefix is used in this manner herein. Thus, for example, the given IP subnet address prefix of "11.1/16" indicates that addresses "11.1.0.0" to "11.1.255.255" will be considered within the prefix or that any combination of the last 16 bits of all subnet addresses starting with "11.1" in its first two bytes will be considered within the prefix. A subnet address prefix of "/32" or "X.X.X.X/32" indicates that all available IP addresses are included within the subnet, e.g., broadcast network 12A.

As described above, broadcast networks 12 are referred to as "broadcast" because L2 communications are sent to all routers 14A-14F coupled together via their respective layer 2 communication medium regardless of their addresses. Thus, a broadcast network, unlike a packet-based network, does not link information to an appropriate address but typically performs the less burdensome task of managing collisions, e.g., instances where two or more network devices broadcast information concurrently. Router 14A, for example, broadcasts information across broadcast network 12A to each of routers 14B-14D of broadcast network 12A. Router 14A may address the information to one or more of routers 14B-14D, in which case, all of routers 14B-14D receive the information but only the indicated routers 14B-14D process the broadcasted information while those routers 14B-14D not indicated ignore the information.

As described above, broadcast networks 12 each comprise a layer 2 network where routers 14A-14D couple together via a first layer 2 communication medium and routers 14A, 14E, 14F couple together via a second layer 2 communication medium. Each of routers 14A-14F includes a physical interface that interfaces with the layer 2 communication mediums of their respective broadcast networks 12. In one embodiment, these layer 2 communication mediums each comprise an Ethernet communication medium, and each of routers 14A-14F include an Ethernet interface card that couples routers 14A-14F with the Ethernet communication medium of their respective broadcast networks 12. Assigned to each physical interface, e.g., each Ethernet interface, is an identifier dependent on layer 3 addressing information, where typically the identifier comprises an IP address falling within the subnet IP address prefix described above. For example, the Ethernet interface of router 14A may be assigned an IP address of 11.1.1.1, which falls within the subnet address prefix of 11.1/16.

Generally, routers 14 exchange link information with other routers 14 adjacent to each other. For example, router 14A exchanges link information with router 14C, who may have exchanged link information with router 14G. If so, router 14A may learn of router 14G and in this manner link information propagates across network system 10. The exchange of link information occurs in accordance with a link state protocol (LSP), such as the open shortest path first (OSPF) protocol. In one embodiment described in more detail below, routers 14A-14D designate one of routers 14A-14D as a "designated router" to simply the exchange of link information. Routers 14A, 14E, 14F may also designate one of routers 14A, 14E, 14F as a designated router. A designated router may comprise a virtual router that runs concurrently with the router functionality already present on the designated ones of routers 14A-14F. A designated router can be described generally as a logically separate router from routers 14.

The exchange of the link information across network system 10 begins when one of routers 14A-14F of each of broadcast networks 12 generates a first link state advertisement (LSA) in accordance with the LSP. Typically, the designated router for each of broadcast networks 12 generates a particular type of LSA referred to as a network LSA in accordance with the OSPF protocol. In accordance with the OSPF protocol, this network LSA includes a first identifier dependent on layer 3 addressing information assigned to a physical interface that interfaces with the layer 2 communication medium. As described above, this first identifier may comprise the IP subnet address prefix assigned to broadcast network 12A. For example, assuming router 14A was designated as the designated router for broadcast network 12A, the designated router or virtual router executing on router 14A may generate a network LSA that includes subnet IP address prefix "11.1/16." Although described as sending a subnet address prefix, it should be understood that there are many acceptable formats by which the designated router may transmit a subnet address prefix. In one such exemplary format, the designate router may specify within the LSA an address of "11.1.0.0" and a subnet address mask of "255.255.0.0" to represent subnet address prefix "11.1/16." Router 14A may transmit this network LSA to all routers 14 adjacent to router 14A.

Router 14I, for example, may receive the network LSA generated and transmitted by router 14A. Router 14I may update its link state database to include any new links defined within the network LSA sent by router 14A. Router 14I identifies that router 14A sent this network LSA by examining the first identifier included within the network LSA. However, in some instances, router 14A may output a network LSA for each of broadcast networks 12, and router 14I by examining the identifiers of each network LSA may be unable to distinguish whether the two network LSAs are updating the same or different networks because both broadcast networks 12 share the same identifier, i.e., subnet IP address ranges "11.1/16." If conventional techniques were utilized, Router 14I would likely determine that only one network exists and thus inaccurately represent network system 10 in its link state database.

However, to allow for these instances of overlapping subnet addresses and provide more accurate link information to routers 14, router 14A is configured to support a new type of network LSA according to the enhanced LSP described herein. This second type of network LSA, herein referred to as a "multiple broadcast network LSA," includes a second identifier independent of the layer 3 addressing information assigned to the physical interface of router 14A that interfaces with the layer 2 communication medium. The second identifier may comprise a network identifier that is uniquely assigned to each of broadcast networks 12. Using this second identifier, router 14I may correctly distinguish LSAs that describe link information pertaining to two separate broadcast networks 12 even though the networks are assigned overlapping or identical IP subnet address prefix.

Overlapping IP subnet address prefixes as used herein for exemplary purposes should not be limited to instances where two broadcast networks 12 are assigned the same IP subnet address prefixes, but may include instances where merely one IP subnet address resides in more than one broadcast network. Further, overlapping IP subnet address prefixes may also include instances where one IP subnet address prefix subsumes another IP subnet address prefix. For example, an IP subnet address prefix of "11.1/16" subsumes another IP subnet address prefix of "11.1.1/8," as the 11.1.1/8 prefix would fall within the larger 11.1/16 prefix. As another example, an IP subnet address prefix of "/32" (also commonly referred to as a "host address") subsumes or equals all other address prefixes and thus, automatically overlaps any other IP subnet address prefix within network system 10. Thus, routers 14 support an enhanced link state protocol (LSP) consistent with the principles of the invention as described herein to enable correct representation of broadcast networks assigned any combination of the above overlapping subnet addresses.

Figure 2:
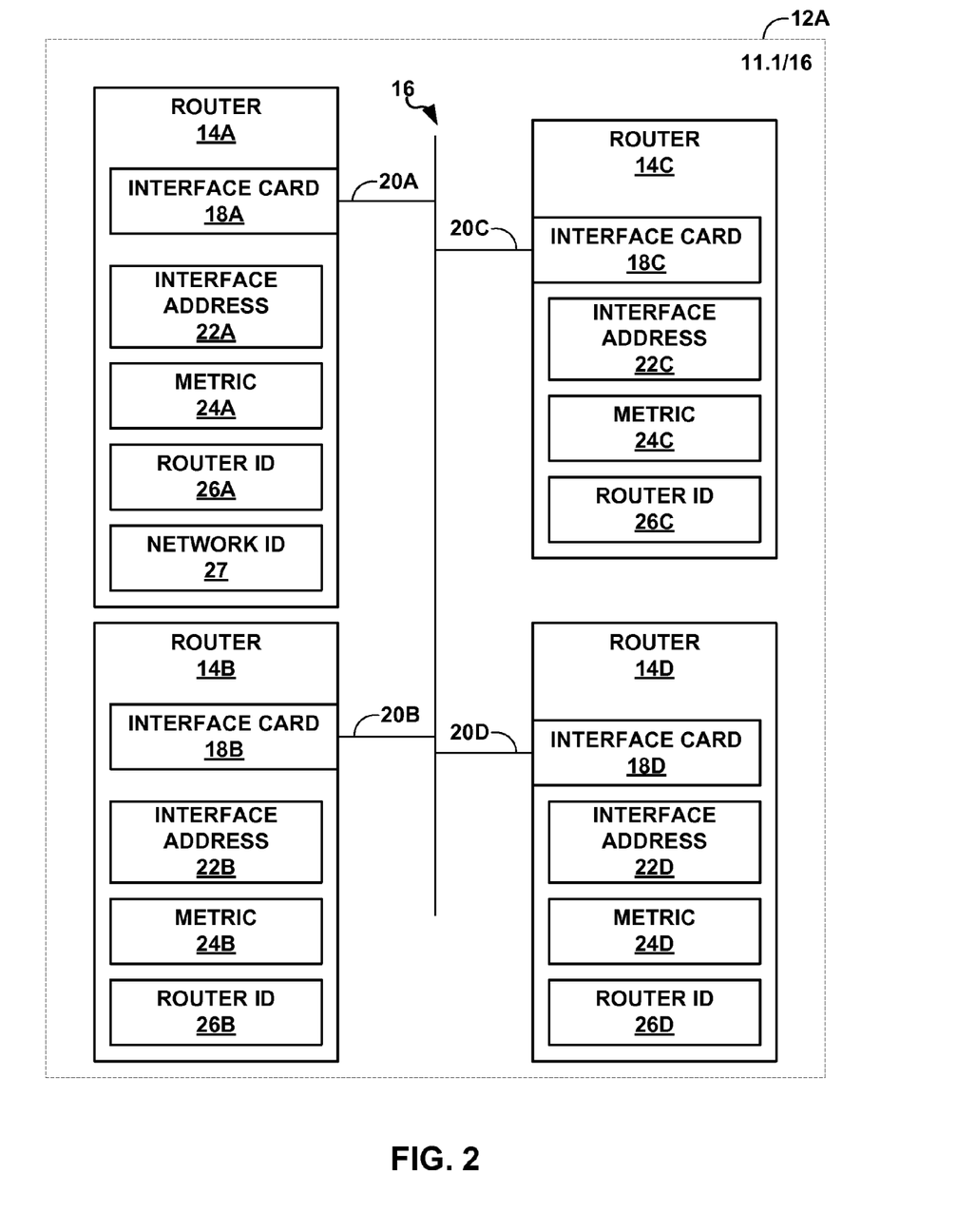
FIG. 2 is a block diagram illustrating the broadcast network of FIG. 1 in more detail.

FIG. 2 is a block diagram illustrating broadcast network 12A of FIG. 1 in more detail. As described above, broadcast network 12A supports the enhanced LSP in accordance with the principles described herein. Further, broadcast network 12A includes routers 14A-14D coupled together via a communication medium 16. Communication medium 16 may comprise a category 5 or cat-5 cable, a category 5e cable, optical links, wireless links or any other medium capable of supporting layer 2 broadcast communications. Although shown as a physical communication medium, communication medium 16 may comprise a wireless medium where information is broadcast via radio, optical, or other wireless signals.

As shown in FIG. 2, routers 14A-14D each comprise at least one respective network interface card 18A-18D ("interface cards 18") that output layer 2 broadcast communications over the underlying physical communication medium 16 having physical links 20A-20D. Each of routers 14A-14D associate a respective layer 3 interface address 22A-22D ("interface addresses 22") with each of the physical interfaces that interface with communication medium 16, e.g., interface cards 18. Interface addresses 22 comprise layer 3 addressing information, such as an IP address. Routers 14A-14D may also determine metrics 24A-24D ("metrics 24") for each of links 20, respectively. Metrics 24 may each comprise a number assigned respectively to each of links 20 that logically represents costs associated with the links (e.g., speed, delay, or utilization of the links 20), as well as, other characteristics associated with links 20. Metrics 24 are generally employed during path selection where routers 14 decide along which of multiple paths to a single destination should forward traffic to that particular destination. Finally, each of routers 14A-14D may further include router identifiers 26A-26D ("router IDs 26"). Router IDs 26 may appear similar in format to IP addresses in that router IDs 26 comprise four bytes separated by a period when written, e.g., 11.1.1.1. Router IDs 26 uniquely identify their associated routers 14A-14D within network system 10.

Initially, as routers 14A-14D come on-line, e.g., make their presences known to other routers 14A-14D via the OSPF routing protocol, routers 14A-14D designate one of routers 14A-14D to operate as the designated router and another of routers 14A-14D as the backup designated router. The selection of the designated router may occur via a number of methods. One such exemplary method requires each of routers 14A-14D to send a "hello" message that includes a priority number to all of the other routers 14A-14D. The one of routers 14A-14D that sends the hello message with the highest priority is selected as the designated router and another one of routers 14A-14D that sends the hello message with the second highest priority is selected as the backup designated router.

After selecting the designated router via this or any other method, the designated one of routers 14A-14D executes virtual designated router and assigns it a layer 3 address unique to broadcast network 12A, much as routers 14A-14D assign unique interface addresses 22 to interface cards 18. Assuming for purposes of illustration that router 14A was selected designated router for broadcast network 12A, router 14A would begin representing itself as this additional, designated router and assign the designated router its own unique layer 3 address. As the designated router, router 14A would generate and transmit one or more network LSAs to network system 10. The network LSAs create a logical representation of a network topology in which the designated router is a hub within the broadcast network. That is, the network LSAs describe direct links from the designated router to each of routers 14A-14D. This hub-and-spoke representation utilized by OSPF is intended to reduce the number of links that need be described to all other routers 14 and to enable efficient path selection. That is, the network LSA may specify a list of links and for each link in the list specify an associated metric similar to one of metrics 24. One type of network LSAs (e.g., an OSPF network LSA) that may be output by the designated router includes an LSA header in which the designated router specifies a first identifier dependent on layer 3 addressing information assigned to a physical interface of a network device that interfaces with a layer 2 communication medium, e.g., the IP subnet address prefix assigned to broadcast network 12 or "11.1/16." In addition, the designated router may also include a router ID, such as those router IDs 26 assigned to routers 14A-14D, within the LSA header.

When exchanging link information in accordance with a link-state protocol, routers 14A-14D generate and transmit router LSAs. Each of the router LSAs may include a description of its link to the designated router. Alongside each link, routers 14A-14D may include its respective metric 24. Similar to the network LSA, each of the router LSAs may include an LSA header that includes a number of identifiers that allow other of routers 14 to identify the particular one of routers 14A-14D that output the router LSA. Routers 14A-14D typically forward each of their respective router LSAs to the designated router, whereupon the designated router forwards each router LSA to the other routers 14 that are logically represented as "adjacent" to the designated router.

Although described above in relation to broadcast network 12A, routers 14A, 14E, 14F (FIG. 1) may perform substantially the same operations to communicate via OSPF to select a designated router within broadcast network 12B and generate and transmit a network and various router LSAs in accordance with the enhanced LSP described herein. Assuming for purposes of illustration that router 14A was selected as the designated router for broadcast network 12B, router 14A may execute two virtual designated routers, one for each of broadcast networks 12. In this exemplary instance, router 14A may automatically determine that both broadcast networks 12 are assigned the same IP subnet address prefix (in this example), and thus that their IP subnet address prefixes overlap. Because router 14A may automatically identify this situation, router 14A may proactively elect to switch from the conventional OSPF network LSA to the multiple broadcast type LSA described herein.

To generate a multiple broadcast LSA, a designated router assigns its respective broadcast network 12 an identifier that is independent from the layer 3 addressing information assigned to the physical interface that interfaces with communication medium 16. For example, the designated router for broadcast network 12A may assign broadcast network 12A an identifier of "1," which would clearly distinguish it from broadcast network 12B. The designated router generates the multiple broadcast LSA such that it includes the network identifier within its LSA header for example. Alternatively, in another embodiment, the designated router of both broadcast networks 12 may generate a multiple broadcast LSA and include within each multiple broadcast LSA a unique network identifier, such as network identifiers of "1" and "2."

Assuming that router 14A is the designated router for both broadcast networks 12 and that router 14A chooses only to generate a broadcast network LSA for one of broadcast networks 12, this designated router of broadcast network 12A may for example assign broadcast network 12A a network identifier 27 ("network ID 27"). This designated router may determine network ID 27 in any number of ways. In one instance, the designated router determines network ID 27 may receive multiple broadcast LSAs from other broadcast networks specifying other router IDs and network IDs, maintain a list of these network IDs, and choose an network ID not included within its maintained list, e.g., an "unused" network ID. In another instance, the designated router may similarly maintain the list, but choose from a range of unused network IDs. In other instances, the designated router may generate a random network ID and check to make sure it is an unused network ID. In yet other instances, an administrator may assign a static network ID, or better still, a static network ID that can fluctuate within a set range upon the designated router receiving a multiple broadcast LSA having the same network ID, i.e., a conflict occurs. Although many such methods for determining network ID 27 are described above, the designated router may perform any other process capable of determining a network ID and the techniques should not be limited to any one method described above.

In the case where router 14A is the designated router for broadcast network 12A but was not designated the designated router for broadcast network 12B, router 14A may not initially determine that both broadcast networks 12 are assigned the same IP subnet address prefix. In these instances, either the designated router for broadcast network 12B, upon receiving the network LSA from the designated router of broadcast network 12A, or the designated router for broadcast network 12A, upon receiving the network LSA from the designated router of broadcast network 12B, may switch to using a multiple broadcast LSA. Either one may additionally determine the network ID, such as network ID 27, in the any of the number of ways described above.

In either of these instances, the designated router of either of broadcast networks 12 learns of the overlapping IP subnet address prefix by comparing the IP subnet address prefix contained in the received network LSA with their own IP subnet address prefix. That is, in the event that different ones of routers 14 were selected as the respective designated routers for broadcast networks 12A, 12B, one or more of the designated routers may automatically determine that both broadcast networks 12 are assigned the overlapping IP subnet address prefixes by comparison of the received OSPF network LSA. As a result, one or both of the designated routers may proactively elect to switch from the conventional OSPF network LSA to the multiple broadcast type LSA described herein. In all of these instances, the designated routers may employ some amount of intelligence to correctly identify when to begin using multiple broadcast LSAs instead of conventional OSPF network LSAs.

Figure 3:
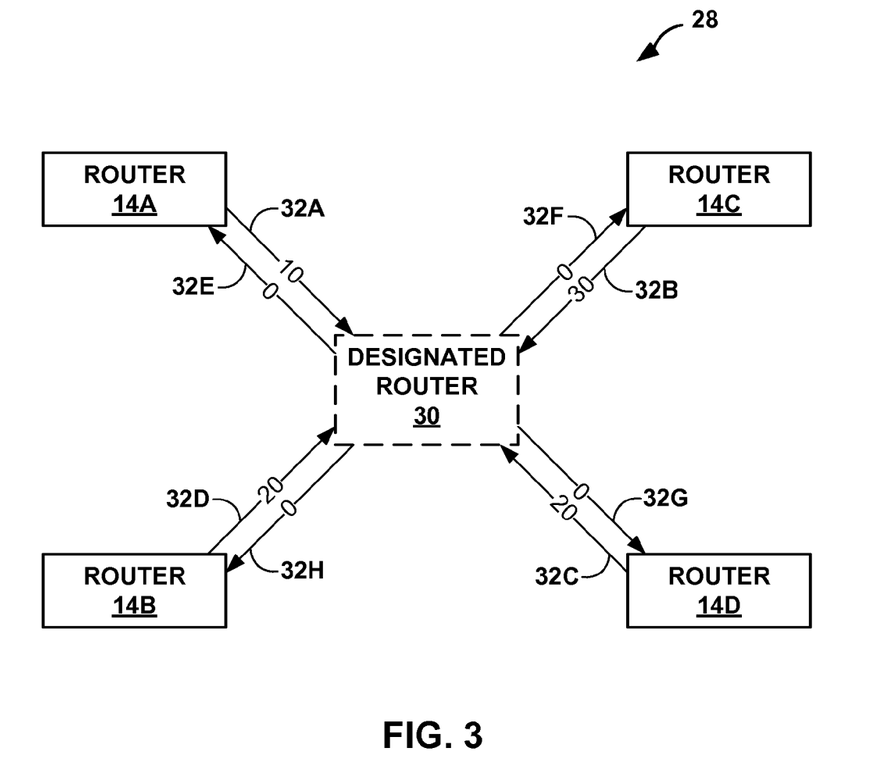
FIG. 3 is a block diagram illustrating an exemplary characterization of a topology as it exists within each the routers of FIG. 1 after a designated router and the routers transmit their respective network LSA and router LSAs across a network system.

FIG. 3 is a block diagram illustrating an exemplary characterization of a logical topology 28 as it is assembled within each router 14 of FIG. 1 after selection of a designated router 30 and transmission of a network LSA and router LSAs across network system 10. Topology 28, as shown in FIG. 3, represents routers 14A-14D as directly coupled to designated router 30 via unidirectional links 32A-32H, where unidirectional links 32A-32D point toward and unidirectional links 32E-32H point away from designated router 30. Although shown graphically as a series of blocks and links, topology 28 may be represented in any format and generally is represented within each of routers 14 in the form of a link state database, or any other such data structure capable of representing a topology, such as topology 28. Thus, topology 28, as shown in FIG. 3, is merely presented for purposes of illustration, and the principles of the invention as described in this disclosure should not be limited strictly to the illustrated embodiment.

Designated router 30 is shown within FIG. 3 as a dashed line box. The dashed lines indicate that designated router 30 is a virtual router that does not physically exist within the network system 10 but instead the role is implemented within one of routers 14A-14D. Designated router 30 is shown separate from routers 14A-14D to illustrate that it exists as a logically separate router 30 within network system 10. The solid line boxes of routers 14A-14D represent that each of routers 14A-14D exist separate physically, and not just logically, from other routers 14 within network system 10.

In this example, each of links 32A-32D is associated with a number denoting a metric, such as one of metrics 24 of FIG. 2. For example, link 32A comprises the number "10" to represent metric 24A, link 32B comprises the number "30" to represent metric 24B, link 32C comprises the number "20" to represent metric 24C, and link 32D comprises the number "20" to represent metric 24D. Routers 14 can construct the above described portion of topology 28 from the router LSAs sent by each respective router 14A-14D, as the router LSAs specify links 32A-32D, the associated metrics 24, and descriptions of the relation between routers 14A-14D and designated router 30.

To construct the remaining portions of topology 28, i.e., designated router 30 and links 32E-32H, designated router 30 generates and transmits the above described network LSA or a multiple broadcast LSA, as described herein. Links 32E-32H also designate a metric similar to links 32A-32D, however the metric associated with each of links 32E-32H is "0." The metric associated with links 32E-32H is "0" because designated router 30 does not exist as a physically independent router but executes logically on top of one of routers 14A-14D. Because it is only a logical router, most network administrators find that requiring metrics other than "0" needlessly complicates route resolution. However, the principles of the invention may include an association of any metric to links 32E-32H, or more generally to unidirectional links pointing away from designated router 30, and thus the techniques described herein should not be limited as such.

Figure 4:
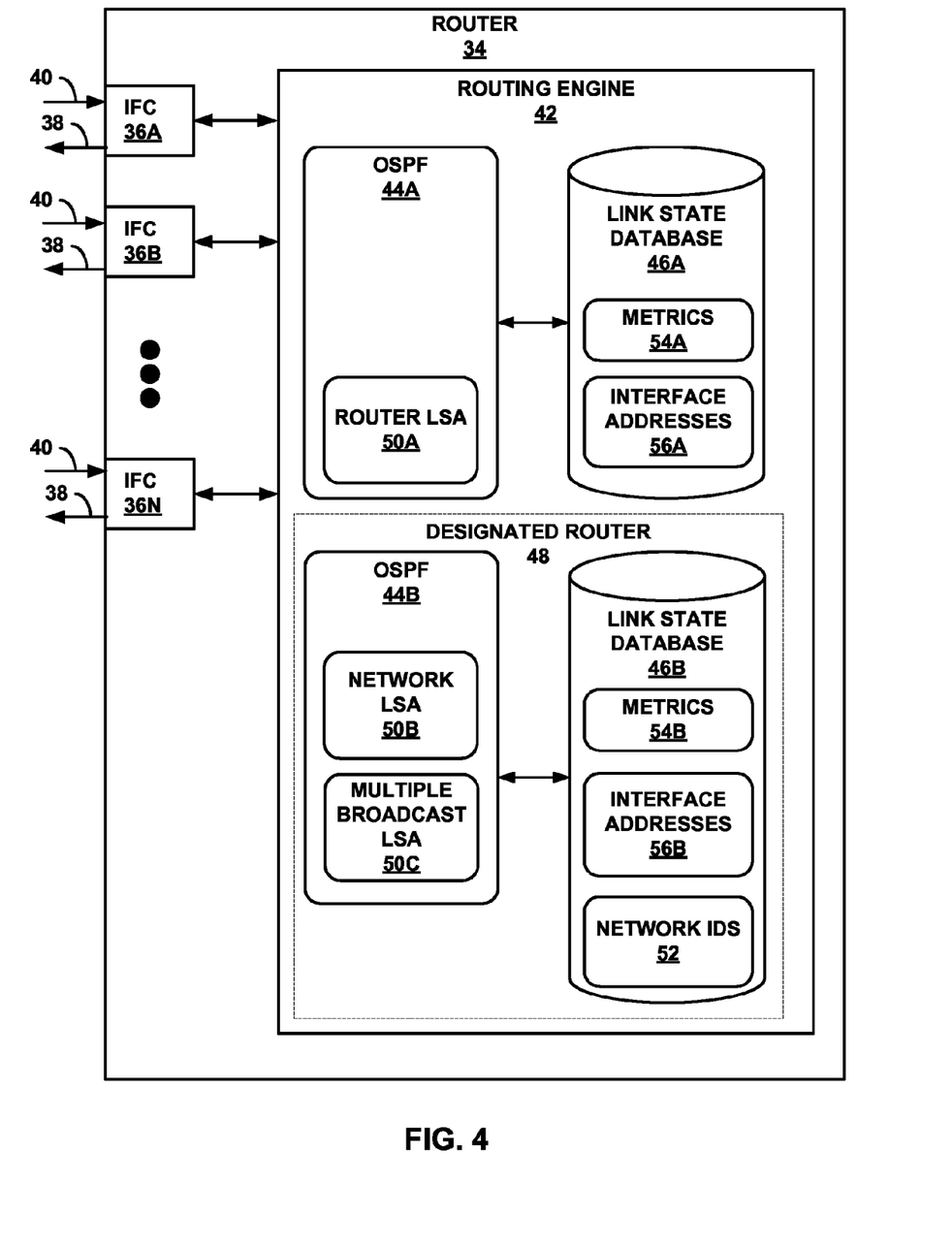
FIG. 4 is a block diagram illustrating a router that supports the enhanced LSP consistent with the principles of the invention.

FIG. 4 is a block diagram illustrating an example router 34 that supports the enhanced LSP described herein. In the example embodiment of FIG. 4, router 34 includes interface cards 36A-36N ("IFCs 36") that send and receive packets via respective network links 38, 40. Router 34 may be substantially similar to routers 14A-14F of FIG. 1 in that one or more of IFC 36 may comprise a physical interface to a layer 2 communication medium and this interface card's associated links 38, 40 may comprise the layer 2 communication medium. Router 34 further includes a routing engine 42 that routes the packets received via links 38, 40 and IFCs 36. Routine engine 42 may comprise software executing within a control unit or processor or one or more dedicated hardware modules, such as integrated circuits, programmed to perform the techniques described herein.

As further shown in FIG. 4, routing engine 42 comprises an OSPF protocol module 44A ("OSPF module 44A") that executes the OSPF link state protocol to update and maintain link state database 46A. In this example, router 34 has been selected as the designated router for the OSPF protocol. Therefore, routing engine 42 is shown to logically incorporate a designated router 48 capable of OSPF communication (e.g., by way of an OSPF protocol module 44B ("OSPF module 44B")) and maintenance of a link state database 46B. Designated router 48 is shown in FIG. 4 as having dashed lines, because again it represents a virtual router, as described above, and is only present if all other routers in a broadcast network designate router 34 as the designated router. Moreover, although shown separately in FIG. 4, designated router 48 may be a logical construct implemented by a single OSPF protocol process running on routing engine 42, e.g., OSPF module 44A. It is assumed for purposes of illustration that router 34 was designated as the designated router for a broadcast network, such as broadcast network 12A.

OSPF module 44A, 44B ("OSPFs 44") each conform to the OSPF routing protocol for exchanging link information between other routers, such as routers 14. Link state databases 46A, 46B ("link state databases 46") are stored on one or more storage media and contain link information and various other information related to physical links within a network system, such as network system 10. Although shown as including particular components, i.e., particular protocol modules 44 and particular databases 46, routing engine 42 may further include additional routing protocol module capable of exchanging information according to the techniques described herein and any type of data structure, such as a linked list, hash table, and binary tree, capable of storing link information.

OSPF module 44A comprises a router LSA 50A, and OSPF module 44B comprises a network LSA 50B and a multiple broadcast LSA 50C. As described above, router LSA 50A describes router 34 in relation to designated router 48, and network LSA 40B describes designated router 48 in relation to all of the other routers, including router 34, in the broadcast network. A multiple broadcast LSA 50C describes the same link topology as network LSA 50B but provide a unique identifier for the subnet that is independent of any layer 3 address assigned to the physical interface with the layer 2 communication medium, which in this instance may comprise one of network identifiers 52 ("network IDs 52") stored to link state data base 46B.

Link state databases 46 may each store metrics 54A, 54B ("metrics 54") and interface addresses 56A, 56B ("interface addresses 56"). Metrics 54 and interface addresses 56 may be substantially similar to metrics 24 and interface addresses 22 described above in reference to FIGS. 2, 3. Link state database 46B, as previously stated, may further store network identifiers 52, which are also described above, but which may be restated as comprising a unique identifier that is associated with a particular broadcast network, such as broadcast network 12A, so that other routers, such as routers 14, may correctly identify broadcast networks having overlapping subnet IP address prefixes. Because designated router 48 may serve as the main forwarding conduit for any LSAs and data inbound to and outbound from its broadcast network, routing engine 42 need not maintain network IDs 52 within its link state database 46A, as it may not receive any messages that include a network ID unless router 34 is present within multiple layer 2 networks.

However, other routers within a network system, such as routers 14G-14I, may be required to maintain a similar mapping between network IDs and broadcast networks within their respective link state databases or similar route storage mediums, as described herein, to facilitate correct identification of broadcast networks having overlapping subnet prefixes. Without such mapping, these other routers would not be able to distinguish between broadcast networks assigned overlapping address spaces. These other routers may generate and maintain their mappings based on the multiple broadcast LSAs, such as multiple broadcast LSA 50C, they receive. For example, upon receiving multiple broadcast LSA 50C, router 14I may parse LSA 50C to determine the unique network identifier 52 and interface address 56B. Router 14I may access its link state database and create, replace, or update its network IDs to add or edit the mapping between the determined unique network identifier 52 and interface address 56B.

Although shown as executing within routing engine 42, designated router 48 may execute separate or independently from routing engine 42 on a control unit or processor. In this embodiment, one or both of routing engine 42 and designated router 48 may be embodied as instructions stored in a computer-readable medium and executable by the processor or control unit. The instructions may cause the processor to perform the principles of the invention as described herein.

Figure 5:
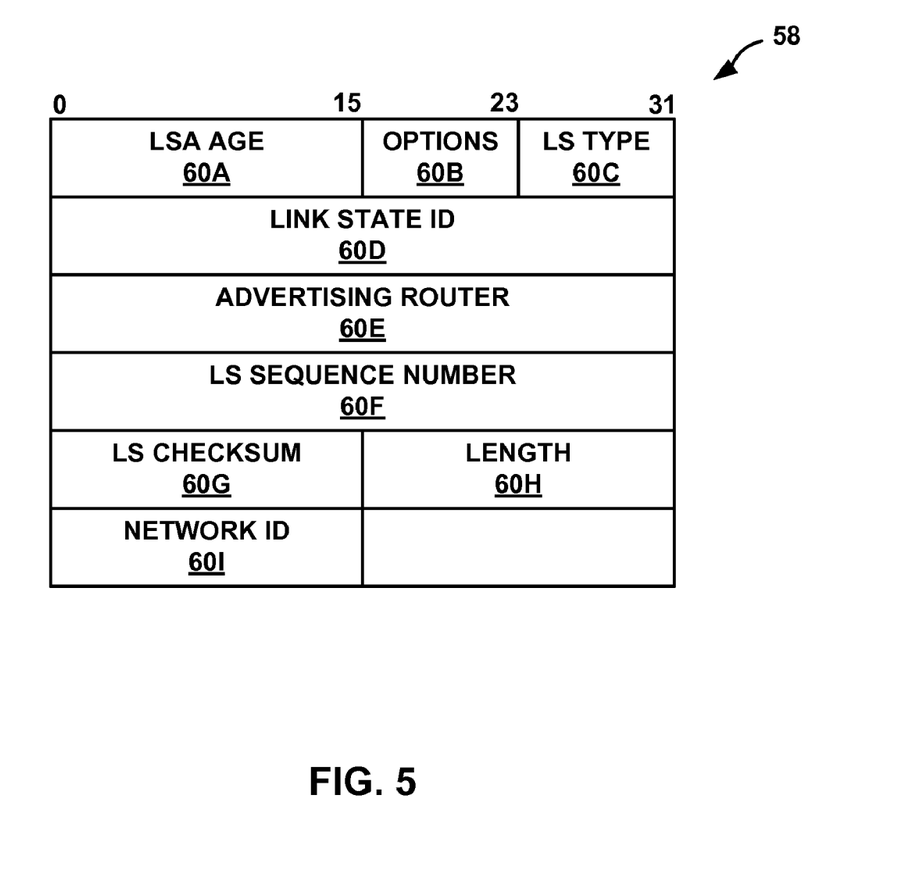
FIG. 5 is an example of a multiple broadcast LSA header for uniquely identifying broadcast networks that have overlapping address spaces.

FIG. 5 is an example of a multiple broadcast LSA header 58 for uniquely identifying broadcast networks that have overlapping address spaces, such as broadcast networks 12 of FIG. 1. Multiple broadcast LSA header 58, as shown in the exemplary embodiment of FIG. 5, complies with the OSPF protocol in that it adheres to the four byte width limitation specified by the OSPF protocol. That is, LSA header 58 comprises a set of four-byte rows, as reflected in FIG. 5 by the 0-31 bit range for each row shown at the top of header 58. Further details of the format of OSPF LSAs can be found in RCE 2328, Internet Engineering Task Force (IETF), April, 1998 herein incorporated by reference.

As shown in FIG. 5, LSA header 58 comprises an LSA age field 60A, options field 60B, LS type field 60C, link state identifier field 60D ("link state ID 60D"), advertising router field 60E, link state sequence number field 60F ("LS sequence number 60F"), link state checksum field 60G ("LS checksum 60G"), length field 60H, and network identifier field 60I ("Network ID 60I"). Although shown as comprising fields 60A-60I ("fields 60"), LSA header 58 may comprise more or less fields 60 shown in FIG. 5 so long as LSA header 58 comprises network ID field 60I.

LS age field 60A typically specifies the age of the LSA bearing LSA header 58 in seconds and is used to distinguish between two LSAs specifying the same LSA sequence number in their respective LS sequence number field 60F. Options field 60B may specify which optional capabilities are associated with the LSA bearing LSA header 58.

LS type field 60C indicates the format and function of the LSA bearing LSA header 58, i.e., the type of LSA. If LS type field 60C stores a "1," for example, the LSA associated with LSA header 58 is designated as a router LSA. Alternatively, if LS type field 60C stores a "2," the LSA defined by LSA header 58 is determined to be a network LSA. LS type field 60C is used herein to indicate that the LSA is a multiple broadcast network type LSA by storing a different identifier (e.g., "6") or any other designation not currently used to define an existing LSA type.

Link state ID field 60D typically identifies a portion of the routing domain that is being described by the LSA bearing LSA header 58. Link state ID field 60D may specify varying types of information depending on what value LS type field 60C stores. For example, if LS type field 60C stores a "1," then the LSA is a router LSA and link state ID field 60D designates the originating router's router identifier, such as one of router IDs 26 of FIG. 2. As another example, if LS type field 60C stores a "2" that designates and OSPF network LSA or the designator defined for the new multiple broadcast type LSA, e.g. "6," then link state ID field 60D designates the IP interface address of the network's designated router, such as interface address 56B of FIG. 4. Advertising router field 60E may specify the OSPF router identifiers of the LSA's originator. Typically, field 60E is used when LS type field 60C stores a "2" or the value designating the multiple broadcast type LSA, e.g., "6," because link state ID 60D, in these instances, may specify something other than the originators router ID, e.g., interface address 56B. Thus, when LS type 60C specifies a "1," LSA header 58 may not include advertising router field 60E, as it would be redundant. LS sequence number field 60F may comprise a signed 32-bit integer that OSPF modules, such as OSPF modules 44 use to detect old and duplicate LSAs. LS checksum field 60G may indicate whether the LSA accompanying LSA header 58 contains errors, and OSPF modules 44 may employ LS checksum field 60G to discard possibly faulty LSAs. Length field 60H indicates the length of the LSA.

Network ID field 60I is a newly defined field that may only appear in an LSA bearing an LSA header 58 designating the multiple broadcast type, e.g., "6," in LS type field 60C. In the event such a value is designated in field 60C, an OSFP module supporting the techniques described herein, such as OSFP module 44B, may construct a multiple broadcast LSA 50C to include exemplary LSA header 58. In LSA header 58, OSFP module 44B designates one of network IDs 52 within network ID field 60I. Thus, network ID field 60I designates an identifier independent of the layer 3 addressing information assigned to the physical interface of the network device that interfaces with the layer 2 communication medium. When LS type 60C stores a "2," link state ID 60D of network LSA 50B provides another identifier dependent on layer 3 addressing information assigned to a physical interface of a network device that interfaces with a layer 2 communication medium, e.g., an subnet interface prefix within which interface address 56B resides. In this manner, a designated router, such as designated router 48 may support two different types of network LSAs 50B, 50C that include two different identifiers for identifying the layer 2 network.

Figure 6:
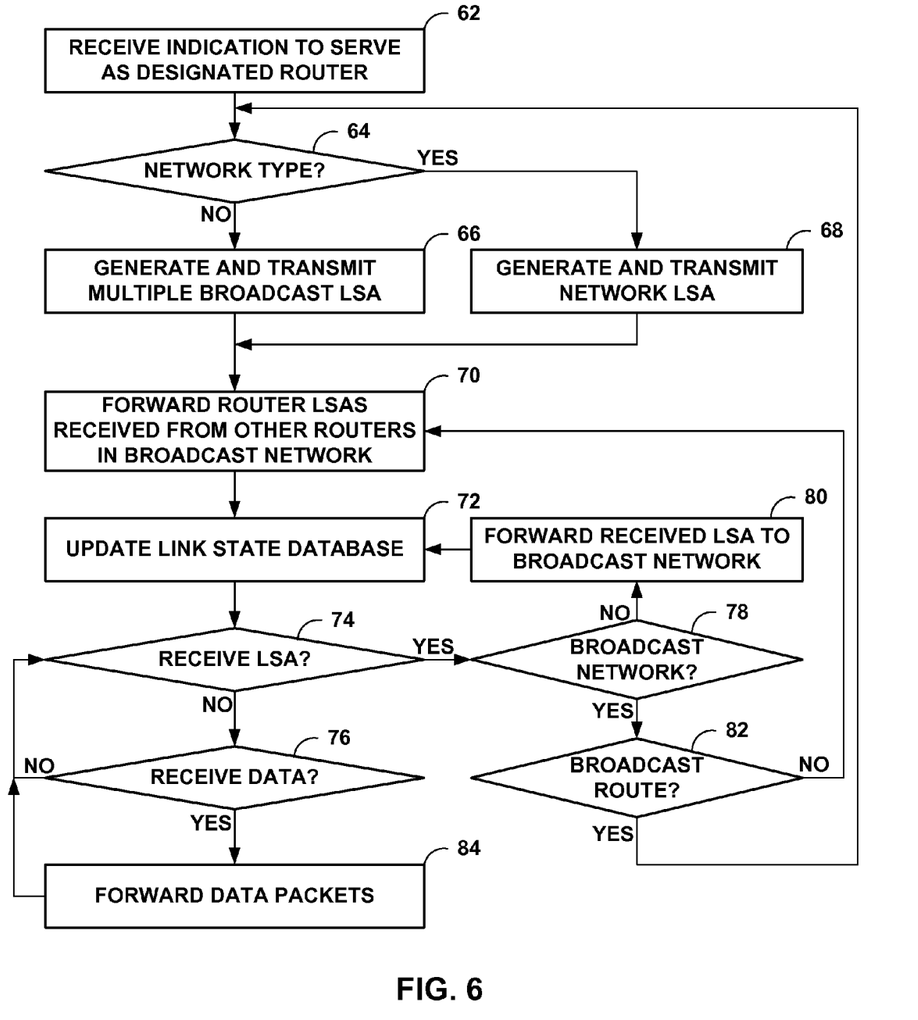
FIG. 6 is a flowchart illustrating exemplary operation of a router in accordance with the principles of the invention.

FIG. 6 is a flowchart illustrating exemplary operation of a router, such as router 34 of FIG. 4, in accordance with the principles of the invention. Although described in reference to designated router 48 of FIG. 4, the principles of the invention may allow any network device to generate a multiple broadcast LSA, such as multiple broadcast LSA 50C, and thereby correctly distinguish between broadcast networks assigned overlapping address spaces.

Initially, the routers of a broadcast network exchange control-plane OSPF messages until one of the routers, such as router 14A of broadcast network 12A, as shown in FIG. 1, is selected as the designated router, i.e., receives an indication to serve as designated router (62). Router 34 of FIG. 4 provides a more detailed view of a router after it has been designated as the designated router, and thus FIG. 6 is described in relation to router 34 for purposes of illustration.

After receiving the indication, the OSPF protocol executed by routing engine 42 interacts with the other routers on behalf of a "virtual router" (shown as designated router 48 within FIG. 4) that represents a hub for the layer 2 broadcast network. At this time, designated router 48 may automatically determine whether to generate and transmit network type LSA 50B or multiple broadcast type LSA 50C when providing link state information to the other routers of the broadcast network (64). As described above, this determination may occur via any number of ways describe above in which designated router 48 learns of overlapping address spaces assigned to two or more broadcast networks. If the determination indicates that no overlapping address spaces exist within the network system, designated router 48 may generate and transmit network LSA 50B (66), which may include via an LSA header similar to LSA header 58 a LS type field 60C that specifies a value of "2," as described above.

Alternatively, if designated router 48 determines that two or more broadcast networks share address spaces, designated router 48 may generate and transmit multiple broadcast LSA 50C (68). As another alternative, designated router 48 may by default generate and transmit multiple broadcast LSA 50C until it learns that there exists either no other broadcast network that shares an overlapping address space with its broadcast network or no two or more broadcast networks that share overlapping address spaces. To generate a multiple broadcast LSA, designated router 48 may specify, for example, a "6" within a LS type field 60C of LSA header 58, thereby designated the LSA as multiple broadcast LSA 50C. Further, designated router 48 specifies within network ID field 60I of LSA header 58 a unique one of network IDs 52 associated with the broadcast network to which designated router 48 belongs.

As described above, designated router 48 may also serve as the main forwarding conduit for any LSAs and data inbound to and outbound from its broadcast network so as to simplify the topology of its broadcast network as represented to other routers. Designated router 48 therefore may receive and forward router LSAs, such as router LSA 50A, from all other routers, e.g., router 34, coupled to the broadcast network to which it belongs (70). In response to receiving these router LSAs, designated router 48 updates link state database 46B to reflect the links specified within each of the router LSAs (72).

Designated router 48 next waits to receive data or additional LSAs from either the rest of the network or other routers belonging to the same broadcast network to which it belongs (74, 76). Upon receiving an LSA, designated router 48 may determine whether it originated from its own broadcast network or outside its broadcast network (78). That is, if designated router 48 executed within router 14B of broadcast network 12A, for example, designated router 48 would determine whether the received LSA originated from one of routers 14A-14D of broadcast network 12A or from one of routers 14E-14I of networks system 10. Designated router 48 may make this determination based on, for example, the link state ID specified in the link state ID field 60D of LSA header 58 that may be included within the received LSA. If the link state ID field 60D identifies one of routers 14A-14D, designated router 48 may determine that the LSA originated from within broadcast network 12A. If the link state ID does not designate one of routers 14A-14D, designated router 48 may determine it originated from outside of broadcast network 12A.

If the received LSA originated outside of its broadcast network, e.g., broadcast network 12A in the above example, designated router 48 forwards the received LSA to its broadcast network 12A, updates link state database 46B according to the received LSA, and again waits to receive further LSAs and/or data (80, 72-76). If the received LSA originates from within its broadcast network, e.g., again broadcast network 12A in the above example, designated router 48 determines whether the received LSA affects a link within broadcast network 12A (82). For example, designated router 48 may receive a router LSA indicating that another router has been added to its broadcast network 12A. In this example, designated router 48 determines that it must send either a new network LSA or multiple broadcast LSA, as well as, forward the received router LSA to the rest of network system 10 and update its own link state database 46B (64-72). However, if designated router 48 determines that the LSA does not affect the link state information for broadcast network 12A, designated router 48 forwards the LSA it received from the other router and updates link state database 46B (70, 72).

In the event designated router 48 does not receive an LSA but does receive a data packet, designated router 48 forwards the data packet to the appropriate address according to its link state database 46B by selecting an appropriate path, outputting the packet on the appropriate interface associated with the first link along the path, and again waiting to receive either an LSA or further data packets (84, 74, 76). Although described in reference to designated router 48, a virtual or logically separate router, the techniques described above may equally apply to a physically and logically separate router, such as router 34.

Various embodiments of the invention have been described. These and other embodiments are within the scope of the following claims.

The invention claimed is:

1. A method of exchanging link state information within a layer two (L2) broadcast network comprising:
   determining whether two or more broadcast networks have overlapping layer three address spaces;
   upon determining that the two or more broadcast networks do not have overlapping address spaces, generating, with a first network device, a first type of network link state advertisement (LSA) in accordance with a link state protocol and transmitting the first type of network LSA on the L2 broadcast network from the first network device to at least a second network device, the first type of network LSA including a first identifier for identifying the layer two (L2) broadcast network, wherein the first identifier is generated based upon layer 3 addressing associated with the L2 broadcast network; and
   upon determining that the two or more broadcast networks have overlapping address spaces, generating, with the first network device, a second type of network LSA in accordance with the link state protocol and transmitting the second type of network LSA from the first network device, wherein the second type of network LSA includes a second identifier for identifying the L2 broadcast network, wherein the second identifier is independent of the layer 3 addressing associated with the L2 broadcast network.

2. The method of claim 1,
   wherein the first identifier is generated to include layer 3 addressing information assigned to a physical interface of the first network device that interfaces with a layer 2 communication medium of the L2 broadcast network, and
   wherein the second identifier is independent of the layer 3 addressing information assigned to the physical interface of the first network device.

3. The method of claim 1, wherein generating the second type of network LSA comprises generating the second type of network LSA in accordance with the Open Shortest Path First (OSPF) link state protocol.

4. The method of claim 1,
   wherein generating the first type of network LSA comprises generating a first type of network LSA with a routing engine of the first network device, and
   wherein generating the second type of network LSA comprises generating a second type of network LSA with the routing engine.

5. The method of claim 1,
   wherein generating the first type of network LSA comprises generating a first type of network LSA with a virtual router executing within the first network device, and
   wherein generating the second type of network LSA comprises generating a second type of network LSA with the virtual router.

6. The method of claim 1, further comprising:
   receiving a third LSA generated in accordance with the link state protocol from a third network device, wherein the third network device couples to the first network device via the layer 2 communication medium; and
   transmitting the third LSA to at least the second network device.

7. The method of claim 1,
   wherein the first type of network LSA includes the first identifier by including one of an internet protocol (IP) subnet address prefix within an LSA header of the first type of network LSA, and
   wherein the second type of network LSA includes the second identifier by including a network identifier uniquely associated with the L2 broadcast network within an LSA header of the second type of network LSA.

8. The method of claim 1,
   wherein the layer 2 broadcast network comprises an Ethernet network,
   wherein the physical interface comprises an Ethernet interface card,
   wherein the first identifier includes a first identifier dependent on layer 3 addressing information assigned to the Ethernet interface card of a first network device that interfaces with the Ethernet network, and
   wherein the second identifier includes a second identifier independent of layer 3 addressing information assigned to the Ethernet interface card of a first network device that interfaces with the Ethernet network.

9. The method of claim 1, wherein generating the second type of LSA comprises:
   populating a link state (LS) type field of an LSA header included within the second type of LSA to indicate that the type of LSA is the second type;
   populating a network ID field within the LSA header of the second type of network LSA with the second identifier.

10. A method of exchanging link state information within a layer two (L2) broadcast network comprising:
    generating, with a first network device, a first type of network link state advertisement (LSA) in accordance with a link state protocol, the first type of network LSA including a first identifier for identifying the layer two (L2) broadcast network, wherein the first identifier is generated based upon layer 3 addressing associated with the L2 broadcast network;

transmitting the first type of network LSA on the L2 broadcast network from the first network device to at least a second network device;

receiving, with the first network device, LSAs associated with two or more L2 broadcast networks;

comparing, with the first network device, the LSAs to determine whether the L2 broadcast network have overlapping address spaces;

automatically switching from using the first type of network LSA to using a second type of network LSA with the first network device upon determining that the L2 broadcast networks have overlapping address spaces;

generating, with the first network device, the second type of network LSA in accordance with the link state protocol, wherein the second type of network LSA includes a second identifier for identifying the L2 broadcast network, wherein the second identifier is independent of the layer 3 addressing associated with the L2 broadcast network; and transmitting the second type of network LSA from the first network device.

11. A computer-readable device comprising instructions for causing a programmable processor included within a first network device to:

determine whether two or more broadcast networks have overlapping layer three address spaces;

upon determining that the two or more broadcast networks do not have overlapping address spaces, generate a first type of network link state advertisement (LSA) in accordance with a link state protocol and transmit the first type of network LSA on the L2 broadcast network from the first network device to at least a second network device, the first type of network LSA including a first identifier for identifying a layer two (L2) broadcast network, wherein the first identifier is generated based upon layer 3 addressing associated with the L2 broadcast network; and upon determining that the two or more broadcast networks have overlapping address spaces generate a second type of network LSA in accordance with the link state protocol and transmit the second type of network LSA from the first network device, wherein the second type of network LSA includes a second identifier for identifying the L2 broadcast network, wherein the second identifier is independent of the layer 3 addressing associated with the L2 broadcast network.

12. The computer-readable device of claim 11, wherein the instruction cause the processor to:

generate the first identifier by generating the first identifier to include layer 3 addressing information assigned to a physical interface of the first network device that interfaces with a layer 2 communication medium of the L2 broadcast network; and generate the second identifier by generating a second identifier that is independent of the layer 3 addressing information assigned to the physical interface of the first network device.

13. The computer-readable device of claim 11, wherein the instruction cause the processor to generate the second type of network LSA by generating the second type of network LSA in accordance with the Open Shortest Path First (OSPF) link state protocol.

14. The computer-readable device of claim 11, wherein the instructions cause the processor to:

generate the first type of network LSA by including one of an internet protocol (IP) subnet address prefix within an LSA header of the first type of network LSA, and generate the second type of network LSA by including a network identifier uniquely associated with the L2 broadcast network within an LSA header of the second type of network LSA.

15. The computer-readable device of claim 11, wherein the layer 2 broadcast network comprises an Ethernet network, wherein the physical interface comprises an Ethernet interface card, wherein the first identifier includes a first identifier dependent on layer 3 addressing information assigned to the Ethernet interface card of a first network device that interfaces with the Ethernet network, and wherein the second identifier includes a second identifier independent of layer 3 addressing information assigned to the Ethernet interface card of a first network device that interfaces with the Ethernet network.

16. The computer-readable device of claim 11, wherein the instruction cause the processor to generate the second type of LSA by:

populating a link state (LS) type field of an LSA header included within the second type of LSA to indicate that the type of LSA is the second type;

populating a network ID field within the LSA header of the second type of network LSA with the second identifier.

17. A computer-readable device comprising instructions for causing a programmable processor included within a first network device to:

generate a first type of network link state advertisement (LSA) in accordance with a link state protocol, the first type of network LSA including a first identifier for identifying a layer two (L2) broadcast network, wherein the first identifier is generated based upon layer 3 addressing associated with the L2 broadcast network;

transmit the first type of network LSA on the L2 broadcast network from the first network device to at least a second network device;

receive LSAs associated with two or more L2 broadcast networks;

compare the LSAs to determine whether the L2 broadcast network have overlapping address spaces;

automatically switch from using the first type of network LSA to using the second type of network LSA upon determining that the L2 broadcast networks have overlapping address spaces;

generate a second type of network LSA in accordance with the link state protocol, wherein the second type of network LSA includes a second identifier for identifying the L2 broadcast network, wherein the second identifier is independent of the layer 3 addressing associated with the L2 broadcast network; and transmit the second type of network LSA from the first network device.

18. A network device that exchanges link state information within a layer two (L2) broadcast network comprising:

a control unit that generates:

(i) a first type of network link state advertisement (LSA) in accordance with a link state protocol, the first type of network LSA including a first identifier for identifying the layer two (L2) broadcast network, wherein the first identifier is generated based upon layer 3 addressing associated with the L2 broadcast network, and (ii) a second type of network LSA in accordance with the link state protocol, wherein the second type of network LSA includes a second identifier for identifying the L2 broadcast network, wherein the second identifier is independent of the layer 3 addressing associated with the L2 broadcast network; and an interface card that interfaces with the layer 2 communication medium and transmits:
(i) the first type of network LSA on the L2 broadcast network to at least one other network device, and
(ii) the second type of network LSA to at least the one other network device,
wherein the control unit generates the first and second type of LSAs by determining whether two or more broadcast networks have overlapping layer three address spaces, generating the first type of network LSA upon determining that the two or more broadcast networks do not have overlapping address spaces, and generating the second type of network LSA upon determining that the two or more broadcast networks have overlapping address spaces.

19. The network device of claim 18, wherein the control unit generates the second type of network LSA by generating the second type of network LSA in accordance with the Open Shortest Path First (OSPF) link state protocol.

20. The network device of claim 18,
wherein the first type of network LSA includes the first identifier by including one of an internet protocol (IP) subnet address prefix within an LSA header of the first type of network LSA, and
wherein the second type of network LSA includes the second identifier by including a network identifier uniquely associated with the L2 broadcast network within an LSA header of the second type of network LSA.

21. The network device of claim 18,
wherein the layer 2 broadcast network comprises an Ethernet network,
wherein the physical interface comprises an Ethernet interface card,
wherein the first identifier includes a first identifier dependent on layer 3 addressing information assigned to the Ethernet interface card of a first network device that interfaces with the Ethernet network, and
wherein the second identifier includes a second identifier independent of layer 3 addressing information assigned to the Ethernet interface card of a first network device that interfaces with the Ethernet network.

22. A network device that exchanges link state information within a layer two (L2) broadcast network comprising:
a control unit that generates:
(i) a first type of network link state advertisement (LSA) in accordance with a link state protocol, the first type of network LSA including a first identifier for identifying the layer two (L2) broadcast network, wherein the first identifier is generated based upon layer 3 addressing associated with the L2 broadcast network, and
(ii) a second type of network LSA in accordance with the link state protocol, wherein the second type of network LSA includes a second identifier for identifying the L2 broadcast network, wherein the second identifier is independent of the layer 3 addressing associated with the L2 broadcast network; and
an interface card that interfaces with the layer 2 communication medium and transmits:
(i) the first type of network LSA on the L2 broadcast network to at least one other network device, and
(ii) the second type of network LSA to at least the one other network device,
wherein the interface card further receives LSAs associated with two or more L2 broadcast networks, and
wherein the control unit generates the first and second type of LSAs by:
comparing the LSAs to determine whether the L2 broadcast network have overlapping address spaces; and
automatically switching from using the first type of network LSA to using the second type of network LSA with the first network device upon determining that the L2 broadcast networks have overlapping address spaces.

* * * * *